UNITED STATES PATENT OFFICE 2,490,518

N-THIO AMINE VULCANIZATION AGENTS FOR BUTADIENE COPOLYMERS

James F. Hand, Hudson, Ohio, assignor to Monsanto Chemical Company, St. Louis, Mo., a corporation of Delaware No Drawing. Application February 3, 1945, Serial No. 576,147

12 Claims. (Cl. 260—79.5)

The present invention relates to a method of vulcanizing synthetic sulfur vulcanizable copolymers of butadiene-1,3 hydrocarbons and to the rubber products obtained thereby.

It is an object of this invention to provide an improved method of vulcanizing a sulfur vulcanizable copolymer of a butadiene-1,3. A further object is to vulcanize a sulfur vulcanizable copolymer of a butadiene-1,3 in the absence of free sulfur. Still another object is to provide vulcanizates of improved properties. Other objects will be apparent from the detailed description following.

In accordance with this invention vulcanization of a sulfur vulcanizable copolymer of a butadiene-1,3 hydrocarbon and a mono vinyl compound is effected by heating the copolymer in the absence of free sulfur with an N-thio amine sulfide contaning at least two sulfur atoms attaching the nitrogen atoms of the residue of a secondary amine.

The vulcanizates obtained by heating a copolymer of butadiene-1,3 hydrocarbons and monovinyl compounds in the presence of sulfur have the serious disadvantage of rapidly deteriorating under the influence of heat. This deterioration, commonly known as heat embrittlement, is probably the result of continued polymerization, oxidation and possibly other causes. The effects noticed are rapidly increasing hardness, low elongation and cracking of the vulcanized stocks.

Since the unaged vulcanizates normally exhibit elasticity over a substantially smaller range of elongations than does natural rubber, the embrittling effect of aging is a serious disadvantage. However, it has now been found that vulcanization by use of N-thio amines instead of free sulfur not only imparts good cures but provides vulcanizates which retain their elastic properties very well.

Although other N-thio amines derived from secondary amines may be used with good results, it has been found that best results are obtained with amine sulfides having two radicals which total at least seven carbon atoms attached to each nitrogen atom, at least one of the radicals being an alkyl or cyclohexyl radical. More particularly, N-thio amines of the general formula

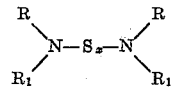

possess outstanding activity as both vulcanizing agents and inhibitors of heat embrittlement, where R represents an alkyl radical and $R_1$ is selected from a group consisting of alkyl, cyclohexyl, and phenyl radicals, R and $R_1$ together containing at least seven carbon atoms.

The vulcanizing agents of this invention can be prepared most conveniently by reacting the amine with a sulfur chloride. Disulfides are formed by combining two molecular proportions of amine with one of sulfur monochloride. Higher sulfides are formed either by reacting with further quantities of a sulfur chloride or by reacting the disulfide with sulfur.

The following are specific embodiments of the invention and illustrate the invention but are in nowise limitative thereof. Stocks were compounded comprising

| Stock | A | B | C | D | E | F |
|---|---|---|---|---|---|---|
| | Parts by weight | Parts by weight | Parts by weight | Parts by weight | Parts by weight | Parts by weight |
| Copolymer of butadiene-1,3 and styrene | 100 | 100 | 100 | 100 | 100 | 100 |
| Carbon black | 40 | 40 | 40 | 40 | 40 | 40 |
| Zinc oxide | 3 | 3 | 3 | 3 | 3 | 3 |
| Mineral hydrocarbon softener | 8 | 8 | 8 | 8 | 8 | 8 |
| N-Cyclohexyl 2-benzothiazole sulfenamide | 2 | 2 | 2 | 2 | 2 | 2 |
| Dicyclohexylamine disulfide | 7 | | | | | |
| Dicyclohexylamine tetrasulfide | | 3.8 | | | | |
| Dibutylamine disulfide | | | 5 | | | |
| Dibutylamine trisulfide | | | | 2.7 | | |
| Di(methyl cyclohexylamine) disulfide | | | | | 6 | |
| Sulfur | | | | | | 2 |

The stocks so compounded were vulcanized in the usual manner by heating in a press at 142° C. The vulcanizates were then aged by heating in circulating air at 100° C. for 24 hours in an oven. The modulus and tensile properties of the normal and aged vulcanizates are set forth below.

Table I

| Stock | Modulus of Elasticity in lbs./in.² at 300% Elong. | Tensile at Break in lbs./in.² | Ult. Elong., Percent | Modulus of Elasticity in lbs./in.² at 300% Elong. | Tensile at Break in lbs./in.² | Ult. Elong., Percent |
|---|---|---|---|---|---|---|
| | 60 min. cure—unaged | | | 60 min. cure—aged | | |
| A | 540 | 2,280 | 655 | 1,000 | 3,270 | 630 |
| B | 575 | 1,085 | 650 | 790 | 2,590 | 520 |
| C | 468 | 2,330 | 715 | 755 | 2,740 | 660 |
| E | 795 | 2,785 | 635 | 1,645 | 2,010 | 345 |
| F | 1,210 | 2,460 | 470 | | 1,990 | 280 |
| | 90 min. cure—unaged | | | 90 min. cure—aged | | |
| A | 578 | 2,360 | 670 | 935 | 3,360 | 670 |
| B | 597 | 2,260 | 680 | 1,070 | 2,045 | 580 |
| C | 438 | 2,420 | 740 | 750 | 2,775 | 730 |
| D | 495 | 2,845 | 770 | 1,055 | 2,600 | 520 |
| F | 1,255 | 2,340 | 435 | 2,000 | 2,160 | 320 |

The data show that amine sulfides provide vulcanizates which are highly resistant to the deteriorating effects of heat.

As further embodiments of the invention stocks were compounded comprising

| Stock | G | H |
|---|---|---|
| | Parts by weight | Parts by weight |
| Butadiene-styrene copolymer | 100. | 100. |
| Carbon black | 40. | 40. |
| Zinc oxide | 3. | 3. |
| Mineral hydrocarbon softener | 8. | 8. |
| Tetramethyl thiuram disulfide | 0.5 | 0.5 |
| Di (ethyl phenyl amine) disulfide | 7.0 | |
| Di morpholine disulfide | | 2.0 |

Vulcanization was effected by heating in a press at 142° C. Good modulus and tensile properties were obtained as shown below.

Table II

| Stock | Modulus of Elasticity in lbs./in.² at 300% Elong. | Tensile at Break in lbs./in.² | Ult. Elong., Percent | Modulus of Elasticity in lbs./in.² at 300% Elong. | Tensile at Break in lbs./in.² | Ult. Elong., Percent |
|---|---|---|---|---|---|---|
| | 30 min. cure—unaged | | | 30 min. cure—aged | | |
| G | 360 | 2,190 | 840 | 655 | 2,640 | 760 |
| H | 560 | 1,290 | 535 | 730 | 1,655 | 545 |
| | 60 min. cure—unaged | | | 60 min. cure—aged | | |
| G | 395 | 2,300 | 810 | 630 | 2,470 | 770 |
| H | 845 | 1,945 | 515 | 1,430 | 1,825 | 500 |

The amine sulfides of this invention are powerful vulcanizing agents for copolymers of butadiene-1,3 and acrylonitrile. For example excellent modulus and tensile properties were exhibited by stocks vulcanized with dibutylamine tetrasulfide. In addition the stocks were highly resistant to swelling by organic solvents. When immersed in a fluid solvent mixture equivalent to aviation gasoline the increase in volume was only 12% as compared to 29% increase of a similar stock vulcanized with sulfur.

While many specific embodiments of the invention have been described, it is at once apparent that many variations can be made without departing from the spirit or scope of this invention. Other amine sulfides may be used with varying results in the copolymers of conjugated butadiene compounds. Other pigments and compounding agents may be used in stocks containing the new vulcanizing agents. Any of the accelerators of vulcanization effective with sulfur vulcanization may be employed.

The present invention is not limited except as defined by the claims attached hereto as part of the present specification.

What is claimed is:

1. The process of vulcanizing a synthetic sulfur vulcanizable rubber-like copolymer of a butadiene-1,3 hydrocarbon and a mono vinyl compound which comprises heating the copolymer, in the absence of sulfur with 2–7 parts on the copolymer of an N-thio amine, as the sole vulcanizing agent, containing at least two sulfur atoms but less than five attaching the nitrogen atoms of two secondary amine residues selected from the group consisting of saturated single ring heterocyclic amine residues and amine residues of the general formula $$\begin{array}{c} R \\ \diagdown \\ \phantom{R_1}N \\ \diagup \\ R_1 \end{array}$$

where R is a member of the group consisting of alkyl and cycloalkyl and where $R_1$ is a member of the group consisting of alkyl, cycloalkyl, and phenyl but when $R_1$ is phenyl R may be only alkyl.

2. The process of vulcanizing a synthetic sulfur vulcanizable rubber-like copolymer of a butadiene-1,3 hydrocarbon and styrene which comprises heating the copolymer in the absence of sulfur with 2–7 parts on the copolymer of an N- thio amine, as the sole vulcanizing agent, containing at least two sulfur atoms but less than five attaching the nitrogen atoms of two secondary saturated single ring heterocyclic amine residues.

3. The process of vulcanizing a synthetic sulfur vulcanizable rubber-like copolymer of butadiene-1,3 and styrene which comprises heating the copolymer in the absence of sulfur in the presence of 2-7 parts on the copolymer of an N-thio derivative of a secondary amine, as the sole vulcanizing agent, containing at least seven carbon atoms and consisting of alkyl and cycloalkyl radicals linked to the nitrogen, two residues of said secondary amine being linked together by at least two but less than five sulfur atoms.

4. The process of vulcanizing a synthetic sulfur vulcanizable rubber-like copolymer of butadiene-1,3 and acrylonitrile which comprises heating the copolymer in the absence of sulfur in the presence of 2-7 parts on the copolymer of any N-thio derivative of a secondary amine, as the sole vulcanizing agent, containing at least seven carbon atoms and consisting of alkyl and cycloalkyl radicals linked to the nitrogen, two residues of the secondary amine being linked together by at least two but less than five sulfur atoms.

5. The process of vulcanizing a sulfur vulcanizable rubber-like copolymer of butadiene-1,3 and styrene which comprises heating the copolymer in the absence of sulfur in the presence of 2-7 parts on the copolymer of a sulfide of dibutylamine, as the sole vulcanizing agent, containing at least two but less than five sulfur atoms linking two residues of dibutylamine.

6. The process of vulcanizing a sulfur vulcanizable rubber-like copolymer of butadiene-1,3 and styrene which comprises heating the copolymer in the absence of sulfur in the presence of 2-7 parts on the copolymer of a sulfide dicyclohexylamine, as the sole vulcanizing agent, containing at least two but less than five sulfur atoms linking two residues of the dicyclohexylamine.

7. The process of vulcanizing a sulfur vulcanizable rubber-like copolymer of butadiene-1,3 and styrene which comprises heating the copolymer in the absence of sulfur in the presence of 2-7 parts on the copolymer of a sulfide of morpholine, as the sole vulcanizing agent, containing two sulfur atoms linking two residues of morpholine.

8. The vulcanized product obtained by heating a sulfur vulcanizable rubber-like copolymer of a butadiene-1,3 hydrocarbon and a mono vinyl compound in the absence of sulfur with 2-7 parts on the copolymer of an N-thio amine, as the sole vulcanizing agent, containing at least two sulfur atoms but less than five attaching the nitrogen atoms of two secondary amine residues selected from the group consisting of saturated single ring heterocyclic amine residues and amine residues of the general formula

where R is a member of the group consisting of alkyl and cycloalkyl and where $R_1$ is a member of the group consisting of alkyl, cycloalkyl, and phenyl, but when $R_1$ is phenyl R may be only alkyl.

9. The vulcanized product obtained by heating a sulfur vulcanizable rubber-like copolymer of a butadiene-1,3 hydrocarbon and styrene in the absence of sulfur with 2-7 parts on the copolymer of an N-thio amine, as the sole vulcanizing agent, containing at least two sulfur atoms but less than five attaching the nitrogen atoms of two secondary saturated single ring heterocyclic amine residues.

10. The vulcanized product obtained by heating a sulfur vulcanizable rubber-like copolymer of a butadiene-1,3 and styrene in the absence of sulfur in the presence of 2.7 parts on the copolymer of a sulfide of dibutylamine, as the sole vulcanizing agent, containing three sulfur atoms linking two dibutylamine residues.

11. The vulcanized product obtained by heating a sulfur vulcanizable rubber-like copolymer of a butadiene-1,3 and styrene in the absence of sulfur in the presence of 3.8 parts on the copolymer of a sulfide of dicyclohexylamine, as the sole vulcanizing agent, containing four sulfur atoms linking two residues of dicyclohexylamine.

12. The vulcanized product obtained by heating a sulfur vulcanizable rubber-like copolymer of a butadiene-1,3 and styrene in the absence of sulfur in the presence of 2.0 parts on the copolymer of a sulfide of morpholine, as the sole vulcanizing agent, containing two sulfur atoms linking two morpholine residues.

JAMES F. HAND.

REFERENCES CITED

The following references are of record in the file of this patent:

UNITED STATES PATENTS

| Number | Name | Date |
| --- | --- | --- |
| 1,873,935 | Lommel et al. | Aug. 23, 1932 |

OTHER REFERENCES

Rubber Chemistry and Technology, Oct. 1944, pages 896-902.

Pages 110 to 115, Rubber Chemistry and Technology, Jan. 1945.